Figure 1:
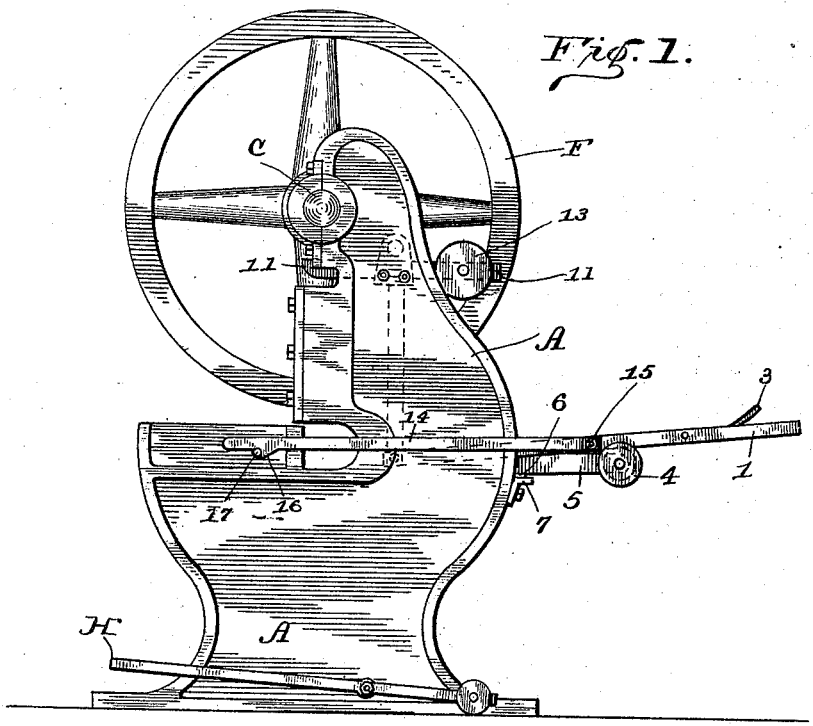

No. 647,189. Patented Apr. 10, 1900.
W. B. LEEDS.
AUTOMATIC HAND-OVER FOR SQUARING SHEARS.
(Application filed Dec. 26, 1899.)
(No Model.)
2 Sheets—Sheet 1.

WITNESSES:
C. S. Frye
J. A. Walsh

INVENTOR
William B. Leeds,
BY Chester Bradford,
ATTORNEY.

No. 647,189. Patented Apr. 10, 1900.
W. B. LEEDS.
AUTOMATIC HAND-OVER FOR SQUARING SHEARS.
(Application filed Dec. 26, 1899.)
(No Model.) 2 Sheets—Sheet 2.
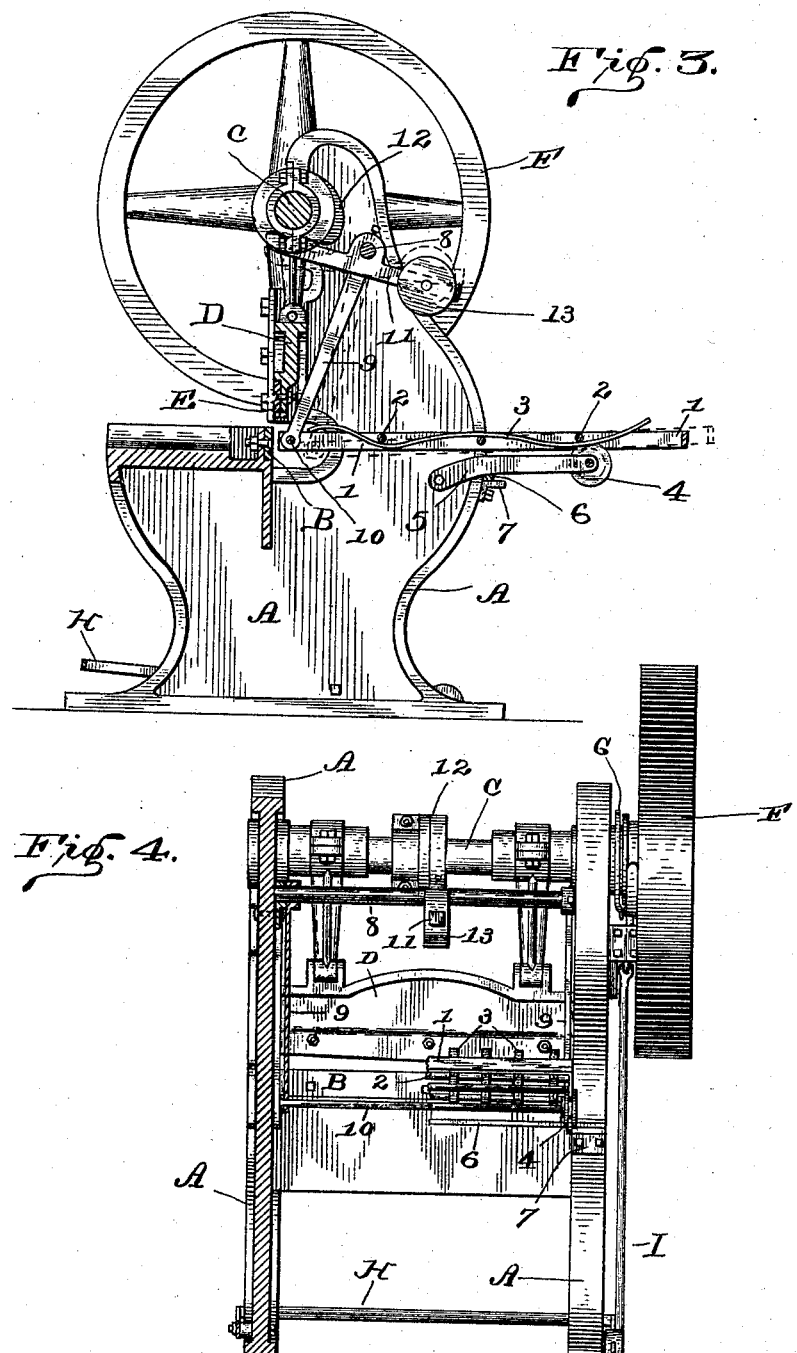
WITNESSES:
C. S. Frye.
J. A. Walsh.
INVENTOR
William B. Leeds,
BY Chester Bradford,
ATTORNEY.

UNITED STATES PATENT OFFICE.

WILLIAM BATEMAN LEEDS, OF CHICAGO, ILLINOIS.

AUTOMATIC HAND-OVER FOR SQUARING-SHEARS.

SPECIFICATION forming part of Letters Patent No. 647,189, dated April 10, 1900.

Application filed December 26, 1899. Serial No. 741,644. (No model.)

*To all whom it may concern:*

Be it known that I, WILLIAM BATEMAN LEEDS, a citizen of the United States, residing at Chicago, in the county of Cook and State of Illinois, have invented certain new and useful Improvements in Automatic Hand-Overs for Squaring-Shears, of which the following is a specification.

Sheets for tinning are usually primarily made twice as large as the finished commercial sheets. The first operation in cutting these sheets to commercial size is to cut them in two in the middle and then to "square up" the remaining three sides. In doing this one-half of the sheet is pushed through the shear to behind the knife. With the ordinary shear the half-sheet first cut off drops down among the trimmings or else a helper is required for the operative running the shear, whose duty it is to take these halves and pass them back to said operative. In any case such halves have to be passed back to the front of the shear before they can be trimmed, which has heretofore involved extra labor, which amounts to a considerable item of cost when the enormous number of sheets produced in a large tin-plate works is considered.

The object of said invention is to aid in the manipulation of the sheets during the squaring-up operation and to dispense with the extra labor above referred to. To this end it consists of a suitable table to receive the halves of the primary sheets cut off by the first shearing operation, as above stated, and after the half which remains in the hands of the operative has been properly squared up to return the half so cut off to the operative automatically without the interposition of manual labor or the employment of a helper.

In this specification I have and will hereinafter speak of "sheets" or "sheets for tinning" in referring to the metal which is handled by the machine embodying my invention. In the practical operation of producing such sheets, however, they are so doubled or folded as that they usually come to the shear in packs of eight sheets, and it will be understood, therefore, that in using the term "sheets" I mean either sheet-packs or single sheets, as the case may be, and that the sheets referred to are commonly sheet-packs.

A machine embodying this invention is shown in the accompanying drawings, which are made a part hereof and in which similar reference characters indicate similar parts, in which—

Figure 2:
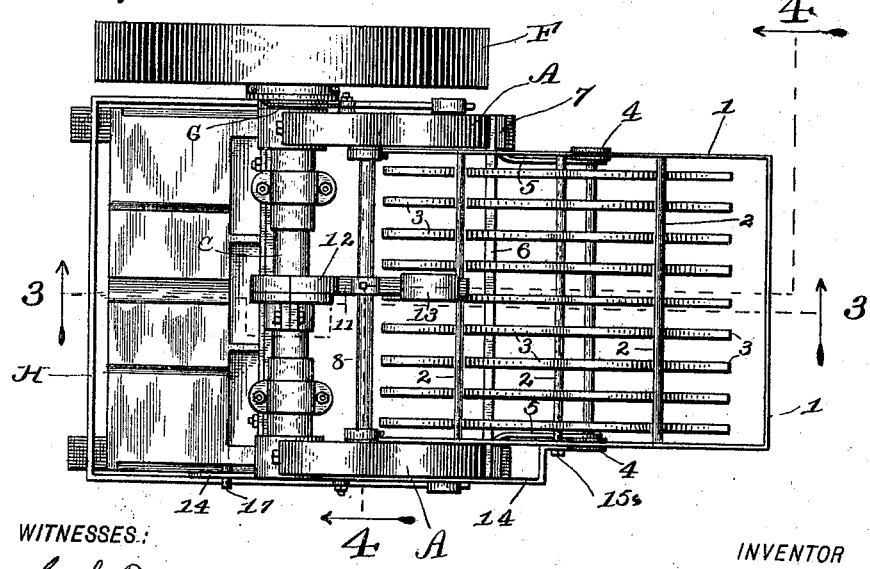

Figure 1 is a side elevation of a squaring-shear embodying said invention, the table being shown in its extreme rear position, which it occupies after the half of the original sheet has been cut off and deposited thereon and while the remaining half is being squared up, said position being, so far as would otherwise be hidden by the frame of the shear, indicated by dotted lines. Fig. 2 is a top or plan view of said squaring-shear, the parts being shown in the same position as in Fig. 1. Fig. 3 is a central vertical sectional view of such a squaring-shear, taken at the dotted line 3 3 in Fig. 2, the table being shown by full lines as swung forward to its extreme forward position, which it occupies when delivering the plate which it carries to the operative. In this figure that position of the table is shown by means of dotted lines which it occupies at the instant the knife is making its primary cut, the difference between the two positions illustrated in this figure showing the distance the forward edge of that part of the sheet which is cut off will project over the front edge of the table, a projection of this amount being necessary in order that the table when it swings forward to the position shown by the full lines shall carry the front edge of the sheet of tin through the opening between the knives to a position where the operative can grasp it and pull it through for further treatment. Fig. 4 is a view, partially in rear elevation and partially in central vertical section, as seen from the dotted line 4 4 in Fig. 2.

So far as the shear proper is concerned it is of the ordinary and well-known construction commonly employed for the purpose of squaring up sheets of tin and consists, essentially, of a heavy frame A, carrying one stationary shear-knife B at a suitable point and having a shaft C, which drives the movable knife-head D, upon which the movable cutting-shear or shear-knife E is mounted, all in a well-known manner, the shaft being intermittingly driven from time to time as may be desired by a loosely-mounted pulley F thereon, there being a suitable clutch G for throwing the shaft and pulley into and out of engagement, which is ordinarily operated by a treadle H through a rod or link I.

The table is preferably an open-slatted table composed of a frame 1, suitable cross-bars 2, and slats 3. It rests at its rear end on rollers 4, preferably carried, as best shown in Fig. 3, by arms 5, and these latter, in order to adapt the table to varying thicknesses of metal or to more or less numerous sheets, should be made adjustable, and this is provided for in the construction shown by resting the same on bars 6, which in turn rest on bearings 7 on the frame A. The adjustment may be made by having several bars 6 of varying thicknesses or by adding thin bars or plates, as may be desired, numerous bars of varying thicknesses being preferable. The table as it is moved back and forth runs easily over the trucks or rollers 4.

The forward end of the table is carried from the rock-shaft 8 by suitable arms 9, which are rigidly connected to said shaft and pivotally connected to the table by pivots or a pivot-rod 10. These arms or links 9 are situated at each side of the table close to the uprights of the frame A. There is also rigidly mounted on the rock-shaft 8 a cross-bar 11, the forward end of which extends to beneath the shaft C and is adapted to be operated by a cam 12, mounted on said shaft. A weight 13 serves to hold the bar 11 against the operative surface of the cam, and thus keeps the table forward as far as the cam will permit, except when said table is held back by other means, as will now be described.

As shown most plainly in Fig. 1, the handle 14 is secured (preferably by a pivot 15) to the table and extends forward alongside the table part of the frame A of the shear to a position convenient to the operative, and its forward end is provided with a catch 16, which is adapted to engage with a pin or projection 17, extending out from the side of said frame.

As heretofore stated, the motion of the table back and forth is controlled by the cam 12 and the weight 13, which operate oppositely to each other. The cam 12 is so positioned as to begin to drive the table back against the force of the weight just before the shears begin to cut, and at the moment of the cutting the table has reached the position indicated by the dotted line in Fig. 3, as above stated. As the shaft continues to revolve it forces the table farther and farther back until it reaches the position shown in Figs. 1 and 2, when the handle 14 will automatically engage with the pin or projection 17, and thereafter the table remains at rest until the handle is disengaged from said projection. The operative permits these parts to remain in this position until he has squared up the part of the tin sheet which he has retained in his hands, after which he raises the handle 14, permitting the table to swing forward and bringing with it the portion of the sheet which was deposited thereon.

Having thus fully described my said invention, what I claim as new, and desire to secure by Letters Patent, is—

1. The combination, with a squaring-shear, of an attachment for receiving the portions of the sheets which are severed at the initial cuts and supporting the same in proper position until the squaring of the remaining portions is completed, and means whereby the same may be caused to return said severed portions automatically to position in reach of the operative, whereby the services of a helper for that purpose are dispensed with.

2. The combination, with a squaring-shear, of a reciprocating table positioned behind said shear for receiving the portions of the sheets which are severed at the initial cuts of the shear, and means whereby said table may be returned toward the shearman bringing said severed portions within his reach for future manipulation.

3. The combination, with a squaring-shear, of a reciprocating table positioned behind said shear, a rock-shaft, links whereby the forward ends of said reciprocating table are suspended to said rock-shaft, an arm on said rock-shaft, a weight on said arm whereby through said rock-shaft and links said table is normally held forward, and a cam operated from the shear-shaft against the force of said weight, whereby the table is driven and held backwardly to proper positions during the revolution of said cam, substantially as set forth.

4. The combination, with a squaring-shear, of a reciprocating table for receiving the portions of the sheets which are severed at the initial cut of a rock-shaft, links for supporting the inner end of said table, an arm on said rock-shaft for rocking the same, and a cam on the pitman-shaft of the shear which comes in contact with and moves said arm, said cam being so positioned as that at the time of shearing the table is held somewhat to the rear of its extreme forward position, and after the shearing is completed is driven back out of the way of the shear, substantially as set forth.

5. The combination, with a squaring-shear, of a reciprocating table for receiving and supporting the portions of the sheets which are severed at the initial cuts, means connected with the driving-shaft of the shear whereby said table is driven backwardly after the cutting is completed, a bar connected to the table having a catch thereon, and a projection with which said catch will engage when the table reaches its rearmost position.

6. The combination of a squaring-shear, a reciprocating table mounted on the frame of said shear for receiving the portions of the sheets severed by the initial cuts of said shear, mechanism driven from the shaft of the shear whereby said table is automatically moved backward when the shearing has been done, and an automatic latching attachment to said table whereby it will be held in said rearmost position until said latch has been purposely disengaged.

7. The combination, with a squaring-shear, of a table for receiving the portions of the sheets which are severed at the initial cuts, and adjustable supports for carrying said table whereby its level relative to the height of the shear may be adjustably determined and varying numbers and thicknesses of sheets thus suitably accommodated.

8. The combination, with a squaring-shear, of a table for receiving the portions of the sheets which are severed at the initial cuts, arms 5 for carrying said table, brackets 7 on the frame of the shear for supporting said arms, and distance-pieces 6 interposed between said brackets and said arms for varying the position of the latter, and thus adjustably determining the height of said table, substantially as shown and described.

In witness whereof I have hereunto set my hand and seal at Chicago, Illinois, this 18th day of December, A. D. 1899.

WILLIAM BATEMAN LEEDS. [L. S.]

Witnesses:
D. G. REID,
EMMA WALTER.